United States Patent [19]

Assarpour et al.

[11] Patent Number: 4,958,303
[45] Date of Patent: Sep. 18, 1990

[54] APPARATUS FOR EXCHANGING PIXEL DATA AMONG PIXEL PROCESSORS

[75] Inventors: Hamid Assarpour, Harvard; Lea Walton, Shrewsbury, both of Mass.

[73] Assignee: Digital Equipment Corporation, Maynard, Mass.

[21] Appl. No.: 193,923

[22] Filed: May 12, 1988

[51] Int. Cl.⁵ ............................................. G06F 15/62
[52] U.S. Cl. .................................... 364/521; 364/518
[58] Field of Search ........ 364/521, 518, 200 MS File, 364/900 MS File

[56] References Cited

U.S. PATENT DOCUMENTS

| | | | |
|---|---|---|---|
| 4,174,514 | 11/1979 | Sternberg | 364/200 X |
| 4,237,532 | 12/1980 | Borgerson et al. | 364/200 |
| 4,363,093 | 12/1982 | Davis et al. | 364/200 |
| 4,363,094 | 12/1982 | Kaul et al. | 364/200 |
| 4,574,394 | 3/1986 | Holsztynski et al. | 364/200 X |
| 4,641,237 | 2/1987 | Yabushita et al. | 364/200 |
| 4,697,247 | 9/1987 | Grinberg et al. | 364/900 X |

Primary Examiner—Gary V. Harkcom
Assistant Examiner—Mark K. Zimmerman
Attorney, Agent, or Firm—Fish & Richardson

[57] ABSTRACT

Computer graphics apparatus including a host computer, a plurality of pixel-processors and associated respective frame buffers controlled by the host computer to permit simultaneous pixel-processing, a device for displaying a graphics image described by pixel data stored in the frame buffers, and switching circuitry connected for simultaneously receiving pixel data from source pixel-processors and returning the pixel data to selected destination pixel-processors.

21 Claims, 3 Drawing Sheets

APPARATUS FOR EXCHANGING PIXEL DATA AMONG PIXEL PROCESSORS

BACKGROUND OF THE INVENTION

The invention relates to exchanging pixel data among a plurality of pixel-processors in a computer graphics system.

In computer graphics an image is stored and processed electronically in a graphics processing subsystem and can be displayed on a cathode ray tube (CRT) monitor or printed at a printer. The image is often broken up into a two-dimensional array of pixels, which are the smallest addressable components of an image. A frame buffer is used to store pixel data indicating the states (e.g., color, intensity) of corresponding pixels, and the frame buffer is repeatedly accessed at a high rate (30 or 60 times per second) to display the image on the monitor. A pixel processor is used to create and process the pixel data stored in the frame buffer, and the pixel processor and frame buffer are controlled by the host computer, often in conjunction with other processors in the graphics processing subsystem.

In some graphics processing subsystems, the image is split up among a plurality of pixel-processors and associated frame buffers to speed up the processing of an image. In a parallel frame buffer architecture, the pixel array for the entire image is divided into a plurality of much smaller arrays (called cells) in which each pixel is assigned to a different pixel processor and associated frame buffer. E.g., in a 16-pixel processor arrangement having 4×4 cells, each cell is described by boundaries which occur every fourth pixel in the X-direction (from left to right of screen) and Y-direction (downward from top of screen). This permits simultaneous processing by the pixel processors when a small portion of the display is being processed at one time.

When modifying the displayed image, e.g., to move something shown in one portion of the display to another, so-called "bit-block" transfers (also referred to as "raster-ops") are used to transfer data from one frame buffer memory location (which corresponds to a particular screen location) to another. In the parallel frame buffer architecture, such bit-block transfers require movement of data from source pixel processors to destination pixel processors, the data being stored at the appropriate locations in the frame buffers associated with the destination pixel processors. Without such transfer between pixel processors, movements of pixel data are limited to movements along cell boundaries, e.g., every 4 pixels in the X and Y directions in a 4×4 arrangement.

One prior art method of transferring data between pixel processors involves sending the data to the host computer along a host bus and having the host computer then send the data to respective destination pixel processors. Another prior art method of transferring data between pixel processors involves providing a dedicated cache memory to receive the data being transferred from source pixel processors; the data are then forwarded to the destination processors.

SUMMARY OF THE INVENTION

In general the invention features transferring data between a plurality of pixel processors in a plural pixel-processor/associated frame buffer arrangement by using switching circuitry connected to simultaneously receive the pixel data from source pixel processors and route the pixel data to selected destination pixel processors as the data are received. The transfer of data is thus accomplished without tying up the host bus and without the need for additional dedicated external memory.

In preferred embodiments the pixel processors are arranged in rows and columns corresponding to positions of associated pixels in cells, and the switching circuitry includes two stages of multiplexers, one for column processing and one for row processing; the multiplexers are provided with different combinations of row or column rotations as inputs, and each provides a single combination as an output; the column multiplexing stage includes, for each row of pixel processors, a multiplexer receiving data from each pixel processor in the row; the row multiplexing stage includes, for each row of pixel processors, a multiplexer receiving data from each column processing multiplexer and returning data to each pixel processor in the row; and there are a plurality of serial data lines per pixel-processor and a corresponding plurality of groups of multiplexers.

Other features and advantages of the invention will be apparent from the following description of a preferred embodiment thereof and from the claims.

DESCRIPTION OF THE PREFERRED EMBODIMENT

The preferred embodiment will now be described.

DRAWINGS

STRUCTURE

Figure 1:
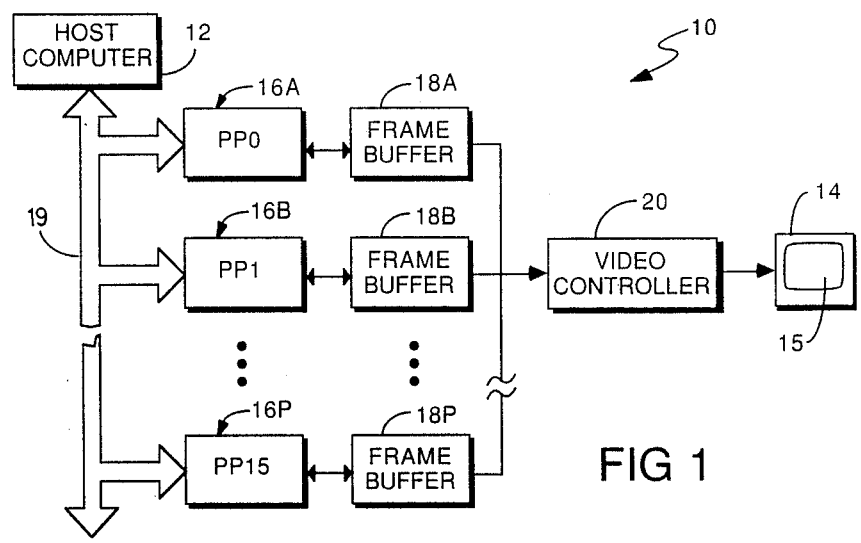
FIG. 1 is a block diagram of a computer graphics system employing a parallel frame buffer architecture.

Referring to FIG. 1, graphics processing subsystem 10, host computer 12, and CRT monitor 14 of a computer graphics system are shown CRT monitor 14 includes display screen 15 for displaying the image created and processed by the computer graphics system. Graphics processing subsystem 10 includes 16 pixel processors 16A-16P (also designated PP0-PP15) and associated frame buffers 18A-18P. Pixel processors 16A-16P communicate with host computer 12 over host bus 19. Video controller 20 receives the outputs from frame buffers 18A-18P and converts the digital data to an analog signal to drive monitor 14. Not shown on FIG. 1 are other processors and data entry devices (e.g., a keyboard) used with pixel processors 16A-16P under the control of host computer 12 to provide interactive graphics processing. For a thorough discussion of the principal concepts of interactive computer graphics, reference should be made to *Fundamentals of Computer Graphics*, by J.D. Foley and A. Van Dam (Addison-Wesley 1982).

Figure 2:
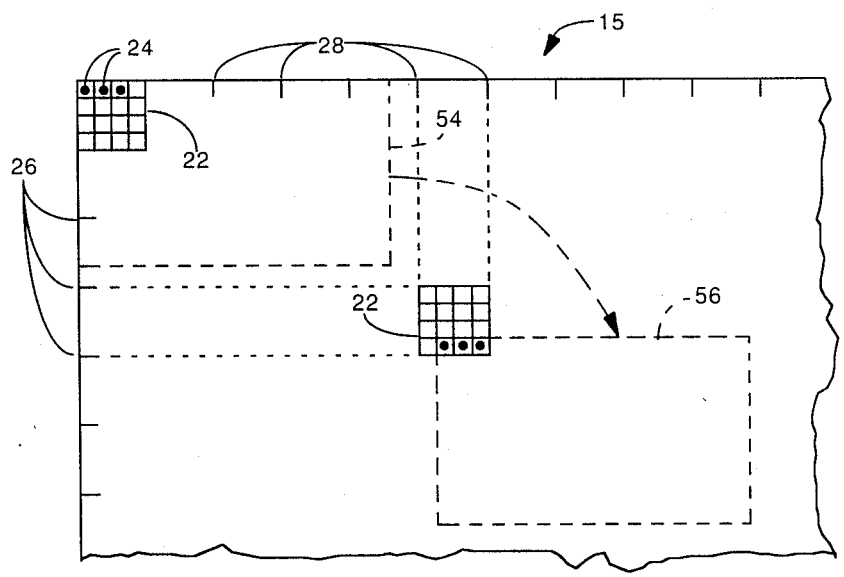
FIG. 2 is a diagram illustrating movement of a portion of an image on a screen of the FIG. 1 system, the movement resulting in an associated transfer of a block of pixel data from one frame buffer location to another.
Figure 3:
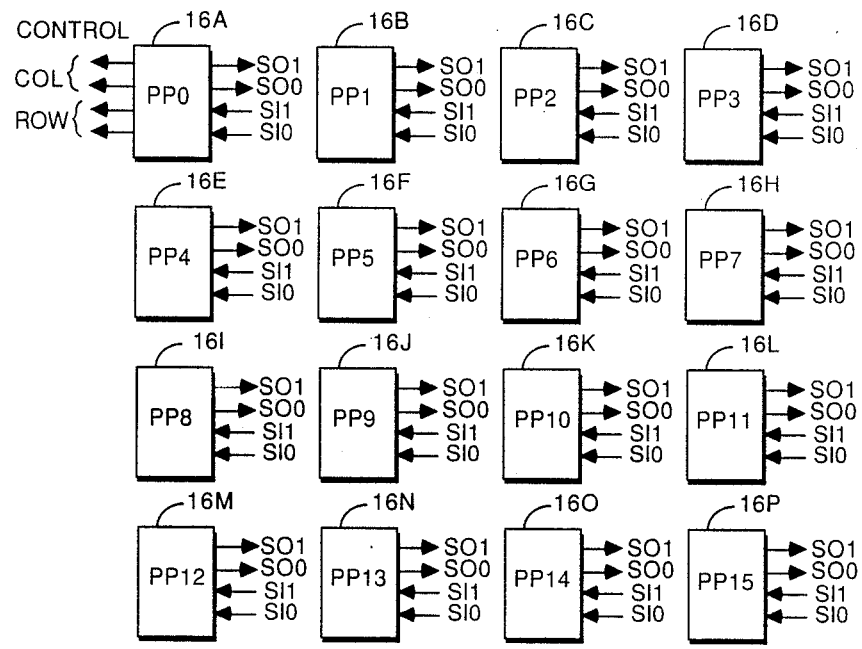
FIG. 3 is a block diagram showing the pixel processors of the FIG. 1 system and switching circuitry according to the invention for transferring data between the pixel processors.
Figure 3:
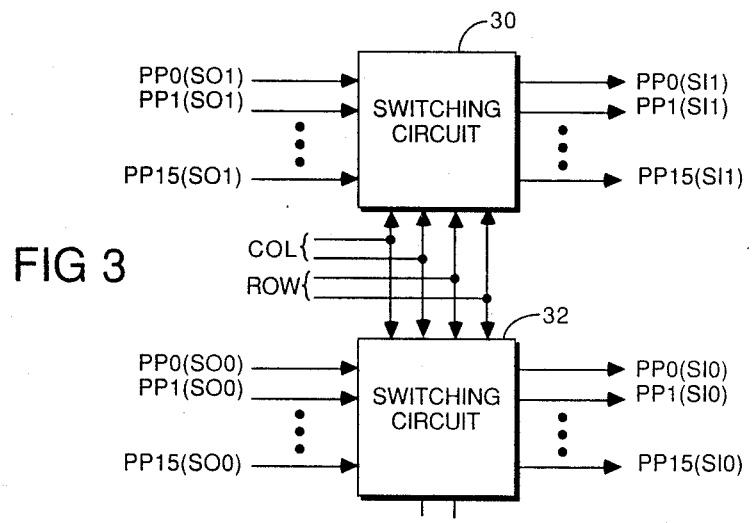

Referring to FIGS. 2 and 3, the graphics image is broken up into pixels 24 grouped in 4×4 cells 22, and each pixel 24 in a cell 22 is processed by a different pixel processor 16A-16P and stored in the associated frame buffer 18A-18P. Two 4×4 cells 22 are shown on display screen 15 of monitor 14 in FIG. 2; the boundaries of other cells on the screen can be obtained by horizontally extending row boundary markers 26 and vertically extending column boundary markers 28.

In FIG. 3, the pixel processors are shown in a 4×4 array corresponding to the locations of the pixel data processed by them in 4×4 cells 22 of the graphic image. Thus pixel processor 16A (also designated PP0) processes the data for the pixels in the first row and first column of every cell 22; pixel processor 16B processes the data for the pixels in the first row and second column of every cell 22, and so on. Each pixel processor 16A-16P has a serial data output line SO1 connected to transfer data to switching circuit 30, a serial data output line SO0 connected to transfer data to switching circuit 32, a serial data input line SI1 connected to receive data from switching circuit 30, a serial data input line SI0 connected to receive data from switching circuit 32, and two column and two row control lines used to control switching of connections between inputs and outputs of switching circuits 30, 32. Each pixel processor 16A-16P also has data, address, and control lines (not shown in FIG. 3) for communicating with host bus 19 and controlling the respective frame buffer 18A-18P.

Figure 4:
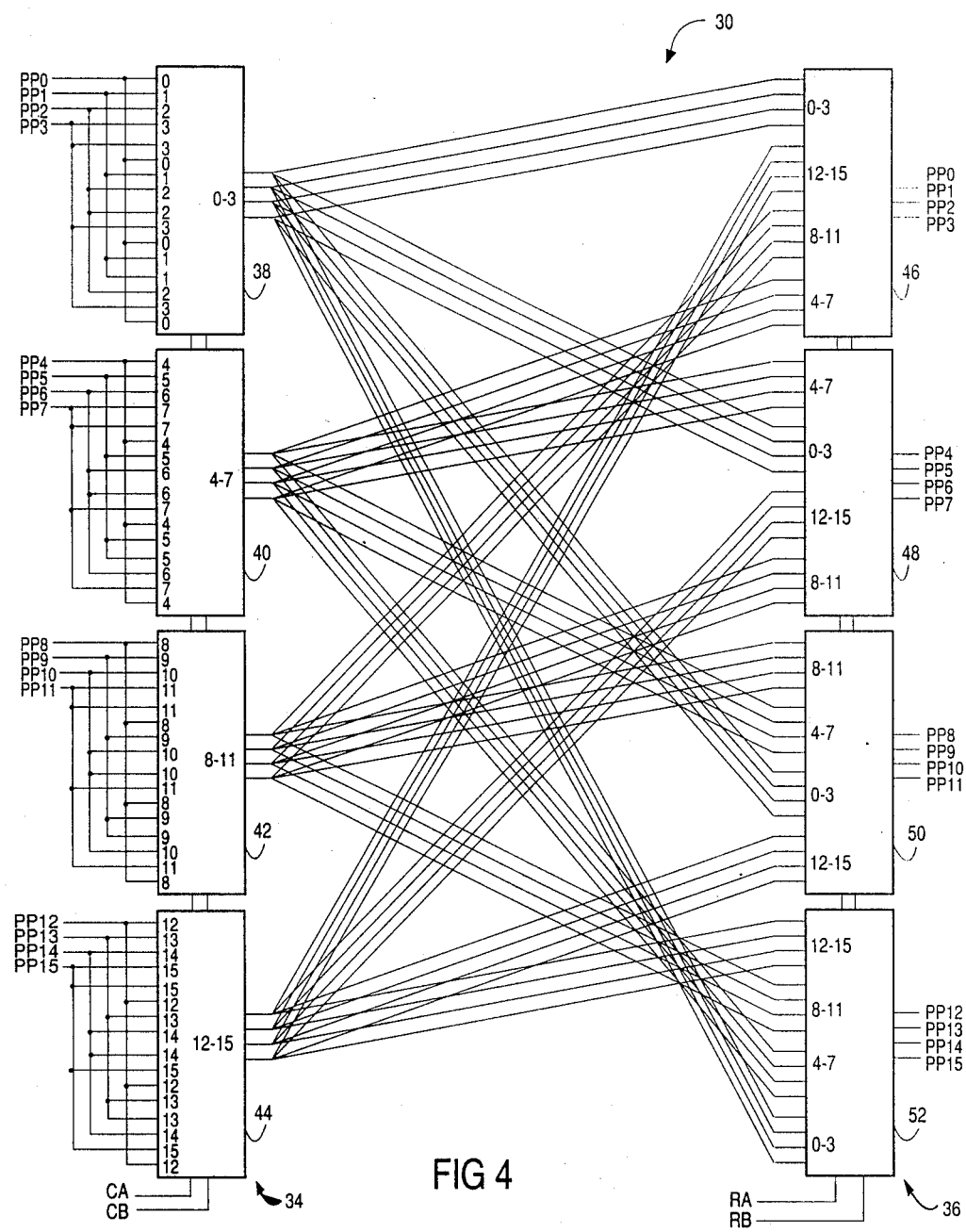
FIG. 4 is a schematic of the FIG. 3 switching circuitry.

Referring to FIG. 4, switching circuit 30 includes two stages of multiplexers, column multiplexer stage 34 and row multiplexer stage 36. Column multiplexer stage 34 includes four 16-to-4 multiplexers 38, 40, 42, 44, each of which receives pixel data from one of the four rows of pixel processors. Row multiplexer stage 36 similarly includes four 16-to-4 multiplexers 46, 48, 50, 52, each of which returns pixel data to one of the four rows of pixel processors. The inputs to each column multiplexer 38-44 are provided in four different combinations, each one shifted in position from the preceding by one column. Thus for multiplexer 38, the four inputs from processors PP0-PP3 are provided in order (0, 1, 2, 3) in the first group, shifted by one column to the right (3, 0, 1, 2) in the second group, shifted by another column (2, 3, 0, 1) in the third group, and shifted by another column (1, 2, 3, 0) in the fourth group. The shifting is also referred to as rotations herein, because in going from one combination to the next the last column is provided as the first. Multiplexer 38 can thus output any of the four combinations provided as inputs. Each row multiplexer 46-52 receives as inputs the outputs of each of the column multiplexers 38-44. These outputs are provided in order at the first combination provided to each multiplexer 46-52 (i.e., pixel data are returned to the row from which it came), are shifted by one row at the second combination provided to each multiplexer 46-52, are shifted by two rows at the third combination provided to each multiplexer 46-52, and are shifted by three rows at the last combination provided to each multiplexer 46-52. Column multiplexers 38-44 all receive the same column control signals CA, CB (which select one of the four combinations of inputs) and thus provide the same amount of horizontal shifting for all rows of inputs. Similarly, each row multiplexer 46-52 receives the same control signals RA, RB, and thus provides the same amount of vertical shifting for each row of outputs.

OPERATION

In operation, graphics processing subsystem 10 and host computer 12 provide for generation and processing of a graphics image displayed on monitor 14 according to techniques known in the art, for example as described in the above-referenced text Pixel data stored in frame buffers 18A-18P are repeatedly accessed by video controller 20 and used to provide an image on display screen 15. When it is desired to perform a bit-block transfer, switching circuits 30, 32 are used to provide for the transfer of data between different frame buffers.

An illustration of a bit block transfer is shown in FIG. 2. It involves transferring the image for block 54 of pixels to block 56, which has the same size as block 54 but is in a different position on screen 15. Because this transfer is not at the boundaries of cells 22, the pixels must be transferred from one frame buffer to another. e.g., the pixels in first three columns of the upper row (indicated by dots in FIG. 2 and processed by PP0, PP1, and PP2) are to be transferred to the last three columns of the bottom row (processed by PP13, PP14, and PP15). In transferring the entire block of pixel data, there is a transfer between pixel processors 16A-16P to the right by one column and downward three rows.

In order to make the transfer, host computer 12 sends commands to the pixel processors identifying the coordinates of the first pixel (upper left-hand corner) at the source and at the destination, the height and width of the block, and what type of Boolean operation (e.g., AND, OR, EXOR) should be performed at the source and destination blocks; for example, copying an image involves leaving pixel data stored at the source locations, and moving an image involves providing background color data at the source locations. The CA, CB and RA, RB control signals are determined by displacement logic in the pixel processors from the least two significant bits of source and destination coordinates. (The least two significant bits identify pixel processors.) Although all pixel processors 16A-16P include the displacement logic, only one is connected to provide CA, CB, RA, RB control signals to switching circuits 30, 32.

In the illustration shown in FIG. 2, the column control signals CA, CB cause the second group of inputs of each column multiplexer 38-44 to be connected to the outputs. The row control signals, RA, RB, cause the last group of inputs to each row multiplexer 46-52 to be provided as outputs. Thus the 3012 input to multiplexer 38 is provided as the output of multiplexer 38, and this combination of inputs to multiplexer 52 is provided as the output of multiplexer 52 to pixel processors PP12-PP15.

For a given bit-block transfer, the column and row control signals, CA, CB, RA, RB, do not change. The pixel data for all cells 22 in block 54 are provided serially over serial data lines SO1, SO0 from source pixel processors and connected through switching circuits 30, 32 to serial data lines SI1, SI0 to destination pixel processors. The transfer of pixel data is thus accomplished at high-speed and without tying up host bus 19 and without using external dedicated memory. At the destination pixel processors, the transferred pixel data are sent to the addresses of the appropriate cells 22 in the associated frame buffer under control of the receiving pixel processor. Switching circuits 30, 32 operate in parallel, doubling the speed of transfer. If further serial data lines are made available, additional switching circuits could be added in modular fashion to provide a further increase in speed.

OTHER EMBODIMENTS

Other embodiments of the invention are within the scope of the following claims.

What is claimed is:

1. Computer graphics apparatus comprising
a host computer,
a plurality of pixel-processors and frame buffers, said frames buffers being connected to communicate with respective pixel-processors, said pixel-processors and frame buffers being controlled by said host computer to permit simultaneous pixel-processing,
means for displaying a graphics image described by pixel data stored in said frame buffers, said means being connected to receive said pixel data, and
first switching circuitry for simultaneously receiving pixel data from each said pixel-processor and returning said pixel data from each pixel-processor to a selected one of said plurality of pixel-processors,
said first switching circuitry including a plurality of inputs and outputs, each said input being connected to a respective pixel processor to receive pixel data from it, each said output being connected to a respective pixel processor to return pixel data to it, said circuitry including electrical connections and switches therein permitting selective connection of any said input to any said output.

2. The apparatus of claim 1 wherein
said pixel data correspond to pixels arranged in rows and columns in cells,
said pixel-processors are arranged in rows and columns, each said pixel-processor processing pixels at a particular row and column position for all said cells, and
said first switching circuitry includes a column multiplexing stage of column multiplexers for controlling the column positions of said pixel data returned to said pixel processors and a row multiplexing stage of row multiplexers for controlling the row positions of said pixel data returned to said pixel processors, the outputs of one said stage providing the inputs for the other said stage.

3. The apparatus of claim 1 further comprising second switching circuitry for simultaneously receiving pixel data from said pixel processors and returning said pixel data to selected different said pixel processors,
said second switching circuitry being connected in parallel to said first switching circuitry so as to provide increased speed of transfer.

4. The apparatus of claim 3 wherein each said first and second switching circuitry includes a column multiplexing stage of column multiplexers for controlling the column positions of said pixel data returned to said pixel processors and a row multiplexing stage of row multiplexers for controlling the row positions of said pixel data returned to said pixel processors, the output of one said stage providing the input for the other said stage.

5. A computer graphics apparatus comprising
a host computer,
a plurality of pixel-processors and frame buffers, said frame buffers being connected to communicate with respective pixel-processors, said pixel-processors and frame buffers being controlled by said host computer to permit simultaneous pixel-processing,
means for displaying a graphics image described by pixel data stored in said frame buffers, said means being connected to receive said pixel data, and
first switching circuitry for simultaneously receiving pixel data from each said pixel-processor and returning said pixel data from each said pixel-processor to a selected one of said plurality of pixel-processors,
said switching circuitry including a plurality of pixel processor inputs and outputs, each said input being connected to a respective pixel processor to receive data from it, each said output being connected to a respective pixel processor to return pixel data to it,
said pixel data corresponding to pixels arranged in rows and columns in cells,
said pixel-processors being arranged in rows and columns, each said pixel-processor processing pixels at a particular row and column position for all said cells,
said first switching circuitry including a column multiplexing stage of column multiplexers for controlling the column positions of said pixel data returned to said pixel processors and a row multiplexing stage of row multiplexers for controlling the row positions of said pixel data returned to said pixel processors, the outputs of one stage providing the inputs for the other said stage,
each said pixel processor input being connected to a plurality of group inputs to said multiplexers, each said group input including a plurality of pixel processor inputs, said pixel processor inputs making up a group input being in different orders with respect to other pixel processor inputs in different group inputs provided to a multiplexer, said different orders including different row or column rotations of said pixel processor inputs, a said multiplexer providing one said group input as an output.

6. The apparatus of claim 3 wherein said column multiplexing stage includes, for each row of pixel-processors, a column multiplexer receiving data over serial data output lines of respective pixel processors in the row of pixel-processors.

7. The apparatus of claim 6 wherein the row multiplexing stage includes, for each row of pixel-processors, a row multiplexer receiving data from all column multiplexers and returning data received from one said column multiplexer to a row of pixel-processors via serial data input lines of respective pixel processors in the row of pixel-processors.

8. The apparatus of claim 6 wherein each said column multiplexer includes N said group inputs, where N is a number of columns in said cell, and said column multiplexers have equal amounts of column shifting associated with corresponding multiplexer inputs and receive common control signals selecting which group input is provided as an output.

9. The apparatus of claim 8 wherein each said row multiplexer includes M said group inputs, where M is a number of rows in said cell, and said row multiplexers have an equal amount of row shifting associated with corresponding multiplexer inputs and receive common control signals selecting which group input is provided as an output.

10. Computer graphics apparatus comprising
a host computer,
a plurality of pixel-processors and frame buffers, said frame buffers being connected to communicate with respective pixel-processors, said pixel-processors and frame buffers being controlled by said host computer to permit simultaneous pixel-processing, means for displaying a graphics image described by pixel data stored in said frame buffers, said means being connected to receive said pixel data, first switching circuitry for simultaneously receiving pixel data from each said pixel-processor and returning said pixel data from each pixel-processor to a selected one of said plurality of pixel-processors, and second switching circuitry for simultaneously receiving pixel data from each said pixel-processor and returning said pixel data from each pixel-processor to a selected one of said plurality of pixel-processors, each said first and second switching circuitry including a column multiplexing stage of column multiplexers for controlling the column positions of said pixel data returned to said pixel processors and a row multiplexing stage of row multiplexers for controlling the row positions of said pixel data returned to said pixel processors, the output of one said stage providing the input for the other said stage, said switching circuitry including a plurality of pixel processor inputs and outputs, each said input being connected to a respective pixel processor to receive data from it, each said output being connected to a respective pixel processor to return pixel data to it, each said pixel processor input being connected to a plurality of group inputs to said multiplexers, each said group input including a plurality pixel processor inputs, said pixel processor inputs being in different orders with respect to other pixel processor inputs in different group inputs provided to a multiplexer, said different orders including different row or column rotations of said pixel processor inputs, a said multiplexer providing one said group input as an output, said second switching circuitry being connected in parallel to said first switching circuitry so as to provide increased speed of transfer.

11. The apparatus of claim 11 wherein each said column multiplexing stage includes, for each row of pixel-processors, a column multiplexer receiving data over serial data output lines of respective pixel processors in the row of pixel-processors.

12. The apparatus of claim 11 wherein each said row multiplexing stage includes, for each row of pixel-processors, a row multiplexer receiving data from all column multiplexers and returning data received from one said column multiplexer to a row of pixel-processors via serial data input lines of respective pixel processors in the row of pixel-processors.

13. The apparatus of claim 7 or 12 further comprising means for providing column rotation control signals and row rotation control signals, said column rotation control signals being provided to all multiplexers of said stage of column multiplexers and said row rotation control signals being provided to all multiplexers of said stage of row multiplexers.

14. A method of swapping pixel data among a plurality of frame buffers in a computer graphics system having an arrangement of a plurality of pixel-processors with associated frame buffers comprising providing switching circuitry connected to receive data from and return data to said pixel-processors, and simultaneously receiving pixel data from each said pixel-processor at said switching circuitry and returning said pixel data to a selected one of said plurality of pixel-processors, said first switching circuitry including a plurality of inputs and outputs, each said input being connected to a respective pixel processor to receive pixel data from it, each said output being connected to a respective pixel processor to return pixel data to it, said circuitry including electrical connections and switches therein permitting selective connection of any said input to any said output.

15. Circuitry for swapping pixel data among a plurality of frame buffers in a computer graphics system including a host computer, and a display means, and an arrangement of a plurality of pixel-processors with associated frame buffers, said circuitry comprising, receiving means for receiving pixel data from said pixel-processors, said receiving means including a plurality of inputs that are each connected to a respective pixel processor to receive pixel data from it, and returning means connected to said receiving means for returning said pixel data from each said pixel processor to a selected one of said plurality of pixel-processors simultaneously with the receiving of said pixel data by said receiving means, said returning means including a plurality of outputs that are each connected to a respective pixel processor to return pixel data to it, said receiving means and said returning means including electrical connections and switches permitting selective connection of any said input with any said output.

16. The circuitry of claim 15 wherein said pixel data correspond to pixels arranged in rows and columns in cells, each said pixel-processor processing pixels at a respective row and column position in said cells, and wherein said receiving means includes a column multiplexing stage of columns multiplexers for controlling the column positions of said pixel data transmitted to a row multiplexing stage and thereafter returned to said pixel processors, and said returning means includes said row multiplexing stage of row multiplexing for controlling the row positions of said pixel data returned to said pixel processors.

17. Circuitry for swapping pixel data among a plurality of frame buffers in a computer graphics system including a host computer and a display means and having an arrangement of a plurality of pixel-processors with associated frame buffers, said circuitry comprising, receiving means for receiving pixel data from said pixel-processors, said pixel data corresponding to pixels arranged in rows and columns in cells, each said pixel-processor processing pixels at a particular row and column position in said cells, returning means connected to said receiving means for returning said pixel data from each said pixel processor to a selected one of said plurality of pixel-processors simultaneously with the receiving of said pixel data by said receiving means, said receiving means including a column multiplexing stage of column multiplexers for controlling the column positions of said pixel data transmitted to a row multiplexing stage and thereafter returned to said pixel processors, and said returning means including said row multiplexing stage of row multiplexers for controlling the row positions of said pixel data returned to said pixel processors, and said switching circuitry including a plurality of pixel processor inputs and outputs, each said input being connected to a respective pixel processor to receive data from it, each said output being connected to a respective pixel processor to return pixel data to it, each said pixel processor input being connected to a plurality of group inputs to said multiplexers, each said group input including a plurality of pixel processor inputs, said pixel processor inputs being in different orders with respect to other pixel processor inputs in different group inputs provided to a multiplexer, said different orders including different row or column rotations of said pixel processor inputs, a said multiplexer providing one said group input as an output.

18. The circuitry of claim 17 wherein said column multiplexing stage includes, for each row of pixel-processors, a column multiplexer for receiving data over serial data output lines of respective pixel processors in the row of pixel-processors.

19. The circuitry of claim 18 wherein the row multiplexing stage includes, for each row of pixel-processors, a row multiplexer for receiving data from all column multiplexers and for returning data received from one said column multiplexer to a row of pixel-processors via serial data input lines of respective pixel processors in the row of pixel-processors.

20. The circuitry of claim 19 wherein each said column multiplexer includes N said group inputs, where N is a number of columns in said cell, and said column multiplexers have equal amounts of column shifting associated with corresponding multiplexer inputs and receive common control signals selecting which group input is provided as an output.

21. The circuitry of claim 20 wherein each said row multiplexer includes M said group inputs, where M is a number of rows in said cell, and said row multiplexers have an equal amount of row shifting associated with corresponding multiplexer inputs and receive common control signals selecting with group input is provided as an output.

* * * * *